United States Patent [19]
Erickson

[11] 3,975,913
[45] Aug. 24, 1976

[54] GAS GENERATOR AND ENHANCED ENERGY CONVERSION SYSTEMS

[76] Inventor: Donald C. Erickson, Annapolis, Md.

[22] Filed: Dec. 20, 1973

[21] Appl. No.: 426,524

[52] U.S. Cl. .................................. 60/645; 60/648; 60/670; 60/671; 60/673; 23/282; 48/197 R; 48/89; 122/21; 126/263; 204/DIG. 4; 204/DIG. 6; 423/648

[51] Int. Cl.² ..................... F01K 21/00; F01K 27/00

[58] Field of Search .................. 204/DIG. 3, DIG. 4, 204/DIG. 6, 274; 60/645, 673, 648, 670, 671, 682; 122/21; 126/263

[56] References Cited
UNITED STATES PATENTS

| | | | |
|---|---|---|---|
| 2,384,463 | 9/1945 | Gunn et al. | 204/DIG. 4 |
| 2,706,890 | 4/1955 | Schmidt | 60/670 |
| 3,070,703 | 12/1962 | Podolny | 60/641 X |
| 3,353,349 | 11/1967 | Percival | 60/523 |
| 3,413,801 | 12/1968 | Meijer et al. | 60/523 |
| 3,829,368 | 8/1974 | Wesley | 204/149 |

Primary Examiner—Allen M. Ostrager

[57] ABSTRACT

A gas generator is disclosed which will simply and reliably effect a gas producing reaction between a gaseous and a liquid reactant. The generator can operate at elevated temperatures and has heat exchange means incorporated. The gas generator is applied as a hydrogen generator to an energy conversion system in which hydrogen from the hydrogen-producing reaction powers a fuel cell and the reaction heat from the hydrogen producing reaction powers a thermal engine, thereby enhancing the energy conversion system relative to one in which the hydrogen generator is merely cooled and its heat is rejected as waste heat. Other possible energy conversion systems based on this gas generator are disclosed.

11 Claims, 5 Drawing Figures

GAS GENERATOR AND ENHANCED ENERGY CONVERSION SYSTEMS

BACKGROUND

The invention herein described was made in the course of a contract with the Office of Naval Research. This invention resulted from a study directed towards defining the maximum endurance achievable in a mobile, closed system, chemically fueled power plant. The stipulation of closed system required that the power plant exchanges no material whatsoever with its environment, thereby excluding for example air breathing systems or systems employing chemical reactions having gaseous end products which must be discharged to the environment. The mobility stipulation implies that the overall plant weight and volume will be the key determinants of endurance.

This invention is directed toward energy limited systems vice power limited systems, i.e., systems requiring enough energy to operate at full power for tens or hundreds of hours, rather than only a few hours or less. This means that the dominant concern is obtaining a low weight and volume of the total fuel and oxidant (reactants) which have to be carried, rather than a low weight and volume for the energy conversion devices.

The weight and volume of reactants necessary for a given amount of endurance are determined primarily by two factors: the energy released by the chemical reaction, both per unit weight of reactants and per unit volume of reactants; and the efficiency of converting this energy to the form of energy desired.

It is well established in the prior art that the reaction of most light metals with oxygen has a very high energy release per weight of reactants. It is also well known that electrochemical conversion—such as occurs in a fuel cell achieves a high efficiency of converting reaction energy to electrical energy, since it is not subject to Carnot limitations. There have been numerous attempts to merge these two concepts to achieve an overall highly efficient, high energy density energy conversion system. A frequent technique has been to react one of the light metals (or their hydrides) with $H_2O$: the alkali metals will displace hydrogen from water, whereas the alkaline earth metals and certain others will displace hydrogen from steam. The hydrogen is then reacted in a hydrogen - oxygen fuel cell. However, the hydrogen evolved represents only roughly one half of the total reaction energy which is released by the metal-water reaction. The remainder is manifested as thermal energy.

The shortcoming of this approach heretofore has been that only the hydrogen has been further converted to useful energy; the thermal energy has either been rejected as waste heat or ignored. The reason for this is that the hydrogen generating reaction has been carried out at low temperatures, where Carnot limitations preclude converting a significant part of the thermal energy to a more useful form of energy. This low temperature has heretofore been required, since the metal or metal hydride fuel has been used in the solid state, and if the $H_2O$ became hot enough to evaporate, it would escape with the product hydrogen.

This invention initiated with the simple objective of improving the prior art energy conversion systems in which hydrogen was generated from metallic fuels and burned in fuel cells. The improvement was to be accomplished by converting to useful form some of the thermal energy of the hydrogen producing reaction. In order to do this, it is necessary to generate the hydrogen at elevated temperatures, where most of the conventional metal fuels are in the liquid state, and to incorporate a heat transfer means in the hydrogen generator. The generator designed to meet these objectives has turned out to have much broader applicability than originally envisioned: it can be used to generate many gases other than hydrogen; and when used as a hydrogen generator, it makes possible several unusual energy conversion systems other than the straight forward combination of a fuel cell and closed cycle thermal engine, with each different energy conversion system having its own special advantages.

SUMMARY

The gas generator contains a liquid body of reactant. Heat exchange means is incorporated to maintain the desired temperature of operation, which in most applications is very high. A baffle arrangement allows injection of a reactant gas into a gas space in the generator, from which it bubbles through the liquid reactant. As it bubbles through the liquid reactant, the desired gas generating chemical reaction occurs, and the product gas collects in a separate gas space from whence it is withdrawn from the generator.

Among the possible applications of the gas generator are the production of gaseous metal halides, the gasification of hydrocarbons and/or coal, and the production of hydrogen gas from molten metals and steam.

In the latter application, the generator produces both thermal energy and hydrogen. These two substances can be further converted to useful energy, such as mechanical or electrical energy in several highly efficient conversion systems, which may be closed systems. For example, the thermal energy can be applied to a closed cycle thermal engine while the hydrogen is applied to a hydrogen-oxygen fuel cell, with the product $H_2O$ recycled to the generator; or both the hydrogen and the thermal energy can be applied to the same thermal engine with the $H_2$ being combusted with $O_2$ thermally in the engine.

GAS GENERATOR

Figure 1:
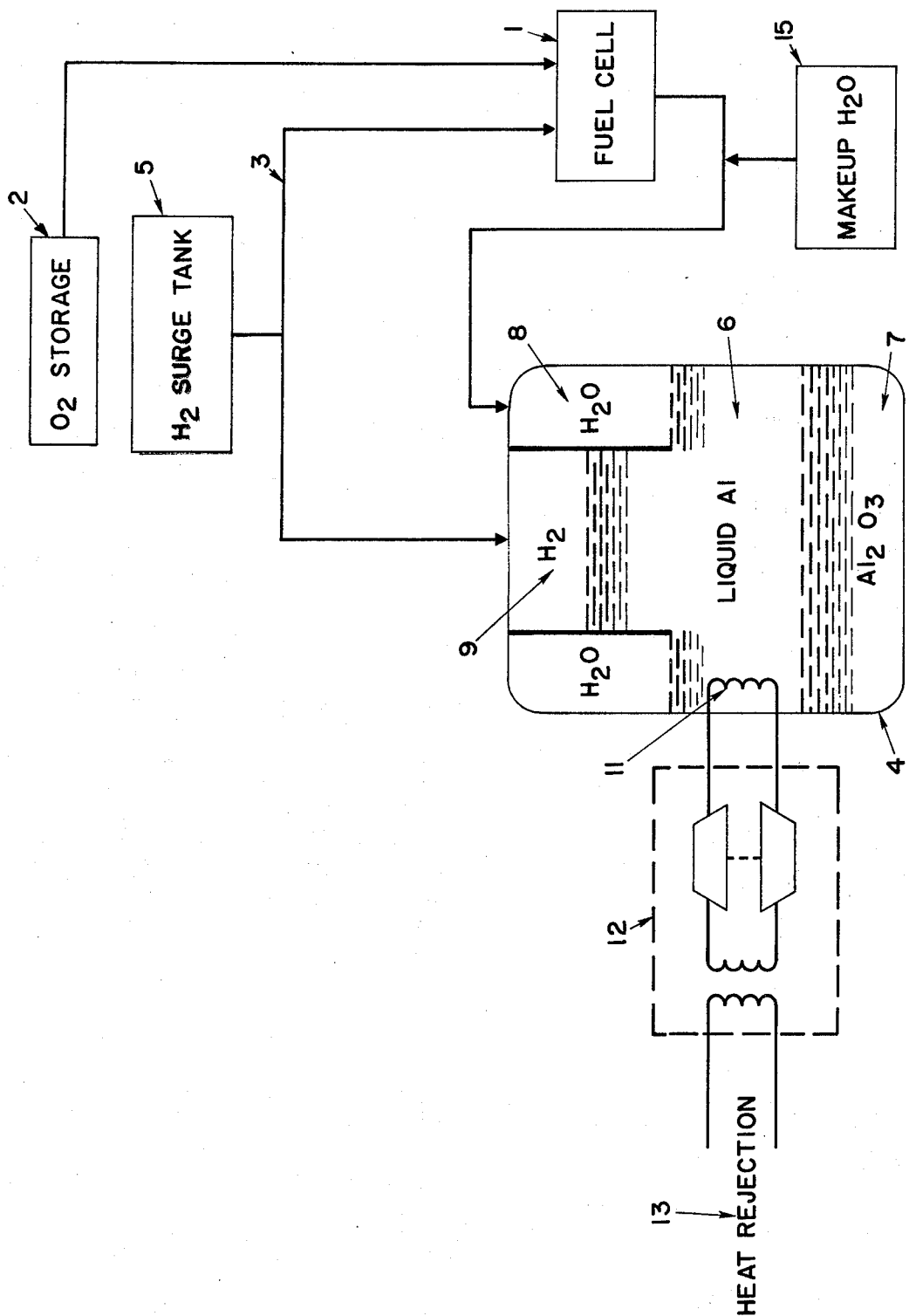
FIG. 1 is a schematic representation of the preferred embodiment of the most efficient closed system energy conversion system which current state-of-the-art makes possible using the disclosed gas generator.

The basic concept of the gas generator is applicable to the chemical generation of a wide variety of gases, using an even wider variety of chemical reactants. The only stipulation is that at the pressure and temperature of operation (i.e., the bulk temperature of the mass of reactants contained in the generator vessel while the gas generating reaction is occurring) one of the reactants be in the liquid state and one reactant be in the gaseous state. Since the temperature of operation can be anywhere from below ambient to very much above ambient, e.g., 2000°F or even higher, many gas-producing reactants which do not meet the above stipulation at ambient temperature will be in the desired state at some elevated temperature.

As an example of the above, when the gas generator design is employed as a hydrogen gas generator, the liquid reactant used in the preferred embodiment is a molten metal. The preferred metals for this application are lithium, aluminum, sodium, potassium, magnesium, and calcium, plus the compound lithium hydride. Any of these can be used individually or in any combination with any of the others. Silicon and beryllium also have the desired properties of displacing hydrogen from steam and having a high energy release per unit weight, but their melting point is too high to be used individually. However, they can be combined with the fuels listed above such that the resulting alloy has a sufficiently low melting point.

The gaseous reactant for the hydrogen generator application has a similar wide latitude of selection. It can be $H_2O$, $H_2S$, $HCl$, $HF$, or $HBr$. The preferred embodiment illustrates the use of $H_2O$ since the energy release using it as an oxidizing agent compares favorably to the other compounds, whereas it is much cheaper and generally safer than the others.

Two other examples of application of the basic gas generator design are the generation of metal halides and of synthesis gas. In the former application the liquid fuel is aluminum, antimony, bismuth, tin, or zinc, and the gaseous reactant is a halogen, particularly chlorine or bromine. In the latter a liquid carbonaceous fuel which may have fine coal particles in suspension is reacted with gaseous $H_2O$. This latter example is distinguished from the preceding ones in that the reaction is endothermic; the heat exchange means in the gas generator is used in this instance to deliver reaction energy as opposed to removing the heat of reaction.

Synthesis gas is comprised of a mixture of CO and $H_2$. The reaction between steam and carbon which produces this gas effectively ceases at temperatures below 1400°F, whereas good yields can be obtained at substantially higher temperatures, e.g., 2800°F. The liquid vehicle which carries pulverized coal in suspension does not itself have to be carbonaceous; for example, good results have been achieved using molten iron as the liquid vehicle.

In summary, the gas generator can be used to generate a wide variety of gases from a wide variety of reactants (at least one being gaseous and at least one being liquid) under a wide variety of conditions (temperature, pressure, heat-releasing of heat-absorbing reaction). One or more gaseous products is generated; one or more nongaseous products may also be generated, or none at all. For example, some of the hydrogen-generating reactions produce a solid metal oxide and some produce a liquid metal hydroxide. The variations to the basic generator design necessary to accommodate these different applications are obvious in light of the teachings subsequently to be disclosed, being primarily changes in shape, size, or choice of materials of fabrication to withstand the respective environments.

The key features of the gas generator in each application are:
1. that the generator contain a body of the liquid reactant and a baffle which extends into that body from above so as to form two compartments (gas spaces) which only communicate with one another through the liquid fuel, that is a gas passing from one to the other must bubble through the liquid fuel;
2. that the reactant gas be controllably introduced into one of these gas spaces and the product gas be collected from the other;
3. that the generator have heat exchange means incorporated; and
4. that the generator be capable of withstanding and operating at high temperatures in the range of 400°F to 2400°F, for example 1600°F.

The embodiment of the gas generator which is subsequently described in detail is the preferred embodiment for the hydrogen generating application when the hydrogen generator is used to power a closed system power plant. In that application lithium and lithium hydride offer the greatest energy release per unit weight of reactants. However, aluminum realizes roughly 80% of the energy weight density of the lithium fuels, and it has a commanding advantage over them in regard to volume and cost (5 times denser and 30 times cheaper). Aluminum is superior to all the other metals in all three categories: energy weight density, energy volume density, and cost. Therefore, in the preferred embodiment aluminum is the major constituent of the liquid fuel and gaseous $H_2O$ (steam) is the gaseous reactant.

Figure 2:
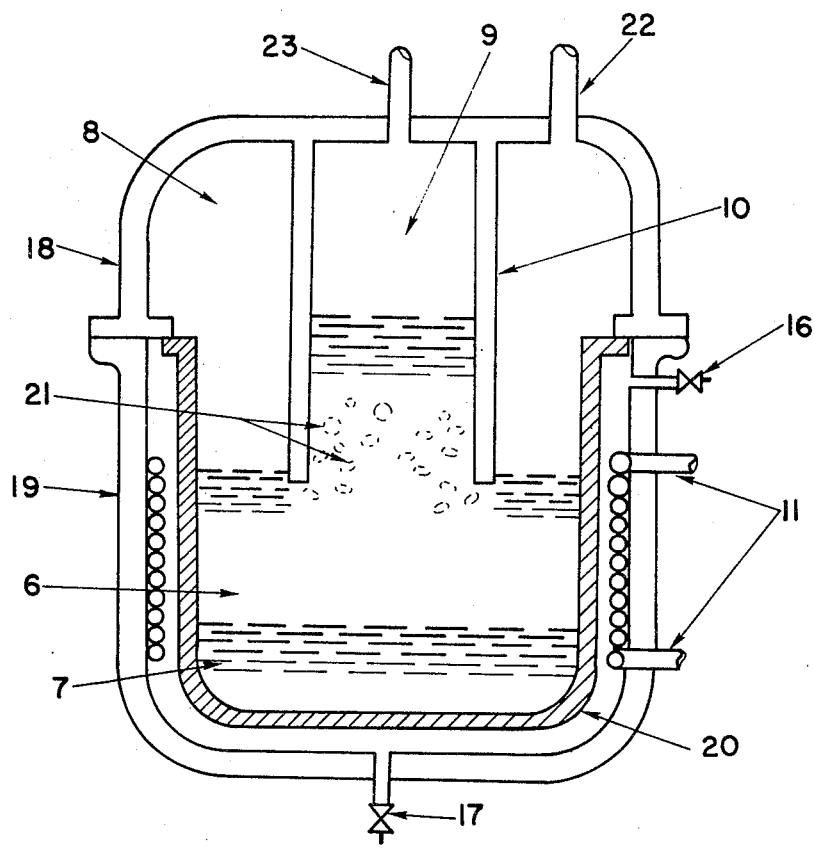
FIG. 2 is a cross sectional view of the preferred embodiment of the gas generator in the hydrogen generating application when aluminum is the fuel.

FIG. 2 is a cross sectional schematic representation of the hydrogen generator. The generator vessel has a permanently mounted main body 19 and a removable head structure 18. A liner 20, which is attached to the vessel head structure and generally conforms in shape to the main body of the vessel, contains the charge of liquid fuel 6 and the nongaseous reaction product 7 (primarily $Al_2O_3$). The desired baffle feature is simply achieved by attaching an open ended cylinder 10 to the inside top of the head structure such that its open end extends into the liquid fuel. Thus, it divides the upper portion of the generator vessel into two compartments: the annular shaped gas space 8 outside the cylindrical baffle, which is arbitrarily designated the inlet gas space, and the cylindrical shaped space 9 inside the cylindrical baffle, which is the discharge gas space. An inlet means is used to inject the reactant gas into the inlet gas space through the vessel head, and an outlet means 23 is used to remove the product gas from the discharge gas space. The heat exchange means is in the form of tubing 11 encircling the inner wall of the lower section of the vessel, with appropriate inlet and outlet penetrations through the vessel wall. The tubes are external to the liner so they do not come in direct physical contact with either the liquid fuel or reaction product. The annular space between the vessel lower body and the liner is fitted with fill and drain connections 16 and 17, which can be used to introduce a substance into that space such as a molten metal which will enhance the heat transfer and provide buoyant support to the liner.

In operation, the gaseous reactant steam is introduced into the inlet gas space through the gas inlet means, which could be a spray nozzle or a simple open pipe. When gas is introduced into the inlet gas space, the pressure increase forces the level of the liquid fuel to go down outside the cylindrical baffle and rise inside the cylindrical baffle. When the liquid level reaches the bottom of the cylindrical baffle, introduction of additional gas will force the gas to bubble around the bottom edge of the cylindrical baffle and up through the molten fuel, as indicated by gas bubbles 21. During this bubble stage, any unreacted gas reacts with the liquid fuel and the product gas is generated, which continues rising through the liquid fuel until it reaches the discharge gas space.

Figure 3:
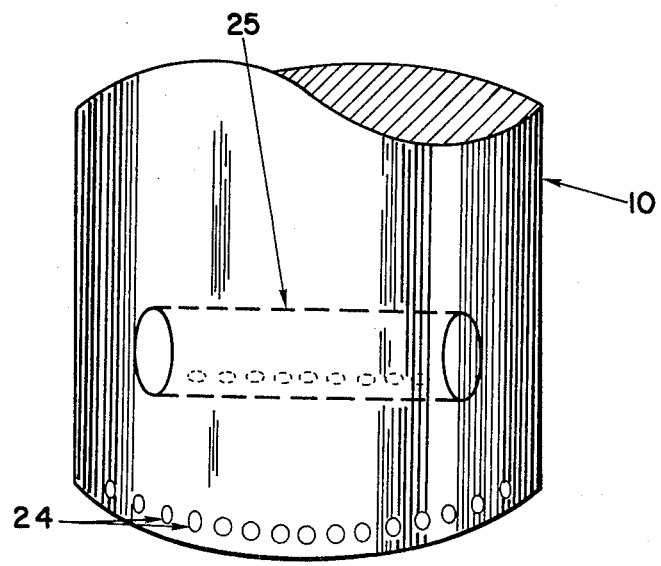
FIG. 3 shows possible details of construction of the baffle inside the gas generator.

The purpose of the baffle is to make it possible to inject the gaseous reactant into a gas space rather than directly into the liquid fuel, while at the same time ensuring that the gas will bubble through and thereby have a chance to react with the liquid fuel. It is obvious that the baffle can have many different shapes or arrangements. Since the desired chemical reaction only occurs at gas-liquid interfaces, the baffle preferably has features which encourage the gas to form many small bubbles as opposed to few large ones. FIG. 3 illustrates two methods of doing this: having numerous small holes 24 through the lower edge of the baffle, and/or penetrating the cylinder with one or more pipes 25 which have holes or slits in their lower portion. This effect could also be achieved from a serrated lower edge on the baffle.

In order to ensure that the chemical reaction proceed reasonably to completion, the zone of reaction where the gas bubbles through the liquid fuel should have a minimum vertical dimension on the order of 6 inches. For gas generating reactions which inherently proceed slowly it may be necessary to incorporate a catalytic agent, for example as a lining on the baffle or an additive to the liquid fuel. Also a labyrinth of bubble traps can be incorporated in the cylindrical baffle whose effect is to slow the rate of rise of the bubbles through the liquid and make them take a tortuous path.

Since the reaction heat is being released in the bubble zone primarily, this will be the hottest spot in the generator (for exothermic reactions). It may be desirable to incorporate additional or alternative heat exchange means right at this location, e.g., embedded in the wall of the cylindrical baffle.

The total cross sectional area of the zone where the reactant gas bubbles through the liquid fuel must be made large enough in relation to the total gas flow at the maximum generation rate that he bubbles do not all coalesce into just a few large ones, thereby restricting the reaction rate and causing excessive pumping action on the liquid fuel.

The volume inside the cylindrical baffle must be large enough to accommodate expected fuel volume changes, plus additional space at the surface of the liquid fuel for foaming which may occur there, plus space for a moisture separator if there is any tendency of the effluent gas to entrap particles of the liquid fuel, thereby preventing the carryover of this liquid into the discharge gas piping system.

There are several advantages to having the baffle feature and the resulting inlet gas space. The means for injecting the gas into the generator vessel is not in actual contact with the liquid fuel. Thus, the chemical reaction does not occur in the vicinity of the injector, preventing such problems as clogging of the injector with reaction product or corrosion of the injector due to locally high temperatures. It is possible to provide separate cooling to the injectors, and even to keep them substantially cooler than the prevailing generator temperature if necessary. These characteristics are particularly advantageous in the generation of metal halides.

If the volume of the inlet gas space is sized to approximately equal the volume inside the cylindrical baffle, then the possibility of backflooding the liquid fuel into the inlet gas piping system is positively precluded; for example, if the pressure of the generator vessel outlet exceeds the inlet pressure, the liquid level inside the cylindrical baffle will be forced down and the level outside the cylindrical baffle will rise, but the inner liquid level will reach the bottom of the cylindrical baffle before the outer liquid level reaches the vessel top where the inlet gas injection means is located.

Further advantages of having the disclosed inlet gas space are that the common surface between the liquid fuel and the gas space provides a location for the gas generating reaction to occur in addition to the surface of each gas bubble. Thus, the reaction will be partially complete before the gas reaches the stage of bubbling through the liquid fuel. Also, the inlet gas space makes it possible to inject the gaseous reactant into the generator in the liquid state. The gas volume, in conjunction with a suitable means for forming the injected liquid into a spray, provides ample opportunity for the liquid to flash to the gaseous state before it reaches the liquid fuel, thereby precluding the more violent reaction which could ensure when slugs of the injected liquid contact the liquid fuel.

In order to accommodate the desired high temperature of operation of the gas generator (e.g., 1600°F for the preferred embodiment of the hydrogen generator) the materials of fabrication must be chosen to withstand that temperature. The outer surface of the generator should be well insulated, preferably by vacuum insulation from a double wall construction. There are no constraints on the operating pressure of the hydrogen generator: the pressure can be quite low, facilitating double wall construction and enhancing the overall safety. The preferred embodiment operates at about 5 atmospheres owing to elements in the energy conversion system subsequently to be described.

The liner should have an inner surface fabricated from a material resistant to attack by both the reactant gas and the product gas as well as the liquid fuel. In the preferred embodiment this would be a super-refractory type material with reasonably high thermal conductivity such as silicon carbide. For small generators holding on the order of a few hundred pounds or less of liquid fuel, the refractory material alone can furnish adequate structural strength. For larger generators containing many tons of fuel, the refractory material should be bonded to a metallic strength member.

Similarly, the portion of the generator vessel which is exposed to the hot metal fuel and to the hot reactant and product gases should be fabricated with an inner lining of material resistant to attack. The bottom edge of the baffle should receive particular metallurgical attention.

As the liquid fuel inside the cylindrical baffle reacts with the gas bubbling through it, it is important that the reaction products be removed from the reaction zone and that fresh fuel replace that which is consumed. If the only product of the gas generating reaction is the generated gas, there is no problem with product removal. However, many of the gas generating reactions of interest also produce either a solid or a liquid product, e.g., a hydroxide or an oxide. These generally have a sufficiently higher specific gravity than that of the liquid fuel that they will settle by gravity to the lower part of the vessel, 7. Thus, it is only necessary to insure that the internal construction of the generator vessel, and particularly of the cylindrical baffle, does not impede this settling out process. For those gas generating reactions in which gravity separation is not sufficient to keep an adequate supply of fresh fuel in the reaction zone of the cylindrical baffle, it is not beyond the scope of the present invention to incorporate means for positive internal recirculation of the liquid contents of the generator. This could be accomplished by injecting the gaseous reactants directly into the liquid fuel through tangentially directed jets, thereby imparting a rotary motion to the liquid; or in some applications by incorporating a magnetic pump in the liquid fuel; or by extending a retractable mechanical stirrer into the liquid fuel after it reaches the molten state.

In those gas generating reactions in which the reaction produces a solid as well as a gas, such as the preferred embodiment in which solid $Al_2O_3$ is a reaction product, designing the generator vessel for a "batch" process shows distinct advantages. Batch process means that the entire inventory of fresh liquid fuel is initially in the generator; it reacts until it is essentially all in the reacted state; then all of the solid product is removed and replaced with a fresh batch of fuel. The advantages of this approach are that the combination of liquid fuel and solid product does not have to be circulated to a location external to the generator and the difficult step of separating the hot liquid fuel from the hot solid product and recycling the liquid fuel is avoided.

Employing the batch process, however, requires special design considerations. First, the volume change which the nongaseous contents of the generator undergo, from fresh fuel to fully reacted solid product, must be allowed for. That is to say, there must be sufficient fuel in the reaction zone of the cylinder for the gas generating reaction to occur both at beginning of life and end of life of the batch of fuel, and there must be sufficient volume below the cylinder to accommodate all of the solid product.

For example, let the beginning of life fuel charge be 10 tons of molten aluminum. This occupies 144 ft³. If nearly all of it is reacted with steam to produce hydrogen, the resulting 18.9 tons of solid $Al_2O_3$ will occupy 183 ft³. The volume expansion is thus 183 minus 144 or 39 ft³ (27%). Thus, the volume below the cylinder should be less than 144 ft³, whereas the volume both inside and outside the cylinder should be at least 39 ft³ in order to prevent the possibility of the liquid fuel being forced into either the inlet or outlet gas piping. As indicated earlier, some additional volume may be necessary inside the cylinder to allow for foaming; also a small fraction of the aluminum will have to be left unreacted at end of life to ensure that the minimum necessary inventory is present in the reaction zone.

It may be desirable to periodically add additional fuel to the generator vessel when using the batch process, for example, if there is a net shrinkage in volume going from fresh fuel to fully reacted fuel, or in those reactions wherein the only product is gaseous.

The fuel to be added can be in the solid state, absorbing the thermal energy necessary to melt it inside the generator. It could be added by gravity using a simple lock-in device, for example, a pipe extended into either the discharge or inlet gas volume which has a space for the fresh fuel separated by two ball valves, or by other means established in prior art teachings.

Although the batch process has been illustrated and described in detail, a continuous feed process would not be outside the scope of this invention. In that process the liquid fuel is continuously added to the generator vessel at the desired rate in addition to the gaseous reactant, and there is a means for removing any nongaseous product either continuously or periodically as necessary. For example, a largely reacted mixture of fuel and product can be removed from the generator, the product separated out, and the fuel recirculated to the generator, or similar prior art teachings. The advantages of this process are that the generator vessel can be much smaller and the fuel can be stored at ambient temperature, which may result in much lower heat loss if the separation process does not involve excessive heat rejection.

Other considerations in the design of a batch process generator are provisions for refueling and for start-up. The removable top and liner are incorporated in the preferred embodiment to facilitate refueling. Disconnect means would allow the gas inlet means 22 and gas outlet means 23 to be disconnected from their respective piping systems. The top and liner are removed and transported as a single unit, with the product contained in the liner. The removed unit would be replaced by one with a fresh batch of fuel in the liner. Thus, neither the molten fuel nor the nongaseous product ever contacts the space outside the liner.

The major consideration with regard to start-up is the establishment of the initial molten state of the fuel for those fuels having high melting points. Although it is possible to do this by loading the fuel initially in the molten state and/or using electrical resistance or induction heating, the preferred method is to use an external heating source and the heat exchange means to heat the fuel part way, e.g., 600°F, and to have a small amount of a highly reactive low melting point metal such as sodium on top of the fuel charge which would be reacted with $H_2O$ to furnish the remaining thermal energy necessary.

HIGH EFFICIENCY ENERGY CONVERSION SYSTEM

The first energy conversion system disclosed based on the preceding hydrogen generator has the highest achievable efficiency based on current state-of-the-art technology, owing to its use of fuel cells. Therefore, it best meets the initially stated objective of achieving a very high endurance (net production of useful energy) from a very low weight and volume of fuel. Useful energy means either mechanical or electrical energy.

FIG. 1 is a schematic representation of this system. In that figure, an $H_2$—$O_2$ fuel cell 1 is supplied oxygen from storage 2 and hydrogen from system hydrogen piping 3. The hydrogen piping receives hydrogen from a hydrogen generator 4, and is also connected to a hydrogen storage device 5 which stores some hydrogen and limits system pressure fluctuations, i.e., acts like a surge tank. The hydrogen generator contains a liquid fuel 6, which is predominantly aluminum; any nongaseous combustion product 7 (aluminum oxide); and a steam inlet space 8 and hydrogen outlet space 9 separated by a cylindrical baffle 10. The hydrogen generator also contains heat exchange means 11 which transfers heat generated in the generator to a thermal engine 12, which is supplied with the necessary heat rejection means 13. The steam inlet space receives H₂O from system H₂O piping 14. That piping connects to the fuel cell 1 and also connects to a source of makeup H₂O 15.

This schematic representation is limited to the key elements of the novel combination; additional elements whose need or value is obvious have been omitted for the sake of clarity. For example, several additional heat exchange means are appropriate, both to maintain the desired operating temperature of individual components and to improve system efficiency by regenerative heating (e.g., hydrogen effluent from the generator heat the working fluid influent to the heat exchange means 11). As another example, means for controlling the rate of injection of H₂O into the generator is obviously necessary; this could be done with a compressor and regulating valve, or by various other known methods.

Neither the type or details of construction of the thermal engine form a part of the present teachings. For the closed system embodiment of the energy conversion system it should be a closed cycle device, but that constraint does not apply to other possible embodiments. It can be a Brayten cycle device, Stirling cycle device, or Rankine cycle device; indeed it can be any energy conversion device which operates subject to the Carnot limitation, which includes thermionic generators, magnetohydrodynamic generators, and even thermally regenerative fuel cells. In the preferred embodiment the thermal engine is represented as a closed cycle Brayten Rotating Unit (BRU) which produces alternating current. These devices currently operate with source temperature of 1600°F, which establishes the nominal operating temperature in the gas generator.

Similarly, the type and details of construction of the fuel cell are not part of the present teachings, although certain desirable characteristics are obvious. For example, the step of separating the product vapor from either of the reacting gases should preferably be simple to accomplish, as it inherently is in the ion exchange membrane type fuel cell. Also a relatively high temperature of operation, e.g., 400° to 800°F, should result in net thermal economies for the whole system, since it reduces the cooling necessary for the H₂ and the heating necessary for the H₂O influent to the generator.

Only a minimum amount of H₂O make-up is necessary in the preferred embodiment using aluminum as fuel. This is because the reaction product is the oxide, and therefore, there is no net consumption of H₂O by the system. In other embodiments, for example, using sodium as the fuel and operating at a temperature of less than 600°F, the hydroxide is formed and therefore there is a net consumption of H₂O. Sea water can be used for this purpose, as the salts will not travel further than the generator vessel if not concentrated out previously. The two possible types of reactions (oxide producing and hydroxide producing) are illustrated below:

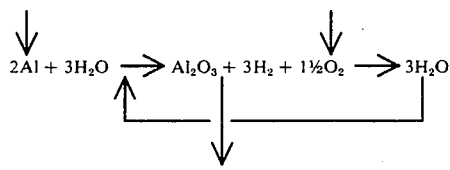
(1)

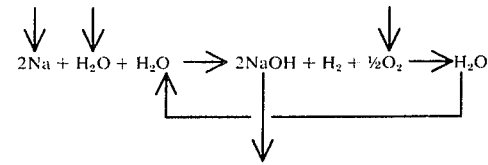
(2)

It can be seen that in each case the overall reaction occurs in two stages, i.e., double reaction, and that only in the latter case is H₂O one of the inputs to the overall reaction.

In the preferred embodiment the oxygen is stored cryogenically as a liquid, in order to reduce its volume. Suitable means for evaporating and heating the oxygen before introducing it into the fuel cell is necessary; this could make use of some of the waste heat rejected from the thermal engine, thereby reducing the overall system heat rejection requirements.

The hydrogen storage tank or surge tank can have several embodiments. from a simple very large, empty container, to a hydride or hydrogen adsorbing type storage device. The well publicized intermetallic compounds such as La Ni₅ are preferred for this application, because of their high storage capacity per unit volume and their low pressure characteristics. This device would establish the operating pressure for the entire system (except thermal engine), and for La Ni₅ it is about 5 atmospheres. Two separate surge tanks are envisioned; one which is normally saturated with the hydrogen, and will supply hydrogen to the system through a relief valve when system pressure drops below 4 atmospheres; and the other normally devoid of hydrogen, which will accept hydrogen from the system through a relief valve when system pressure reaches 6 atmospheres.

During steady state, balanced operation, the ratio of power produced by the fuel cells to that produced by the BRU is determined by the respective net heats of formation and conversion efficiency of each reaction, and is approximately 2.1 to 1. Any departure from this steady state ratio would result in either a temperature change in the combustor vessel, a change in hydrogen inventory, or both. Two features are incorporated to allow such imbalances temporarily: the hydrogen "surge tank" and the large heat capacity of the material in the combustor vessel. These features allow either the BRU or the fuel cell to operate independently of the other for periods of time determined by the respective capacities. This should facilitate maintenance procedures.

A reversible ac to dc motor generator set is envisioned connecting the ac output of the BRU to the dc output of the fuel cells. Control of the power level and direction through this machine should be the major control mechanism of the entire cycle. The control effect is as follows:

should the temperature in the generator vessel drop below normal, the MG set would increase the load on the fuel cells and decrease the load on the BRU. This action causes a hydrogen depletion and pressure drop, and steam buildup and pressure increase. Those effects cause increased flow through the combustor vessel, which increases the heat release rate there, which increases its temperature. This effect requires that the hydrogen and steam pressures be sensitive to the inventory of each; the surge tank should not be designed to eliminate all pressure transients.

It will be apparent that the concept of this energy conversion system is operable as an open system as well as a closed system. For example, air can be supplied to the fuel cell instead of oxygen, and seawater can be supplied to the hydrogen generator, with the fuel cell water being collected to serve as potable water.

ALTERNATIVE 1 — ENERGY CONVERSION SYSTEM

Figure 4:
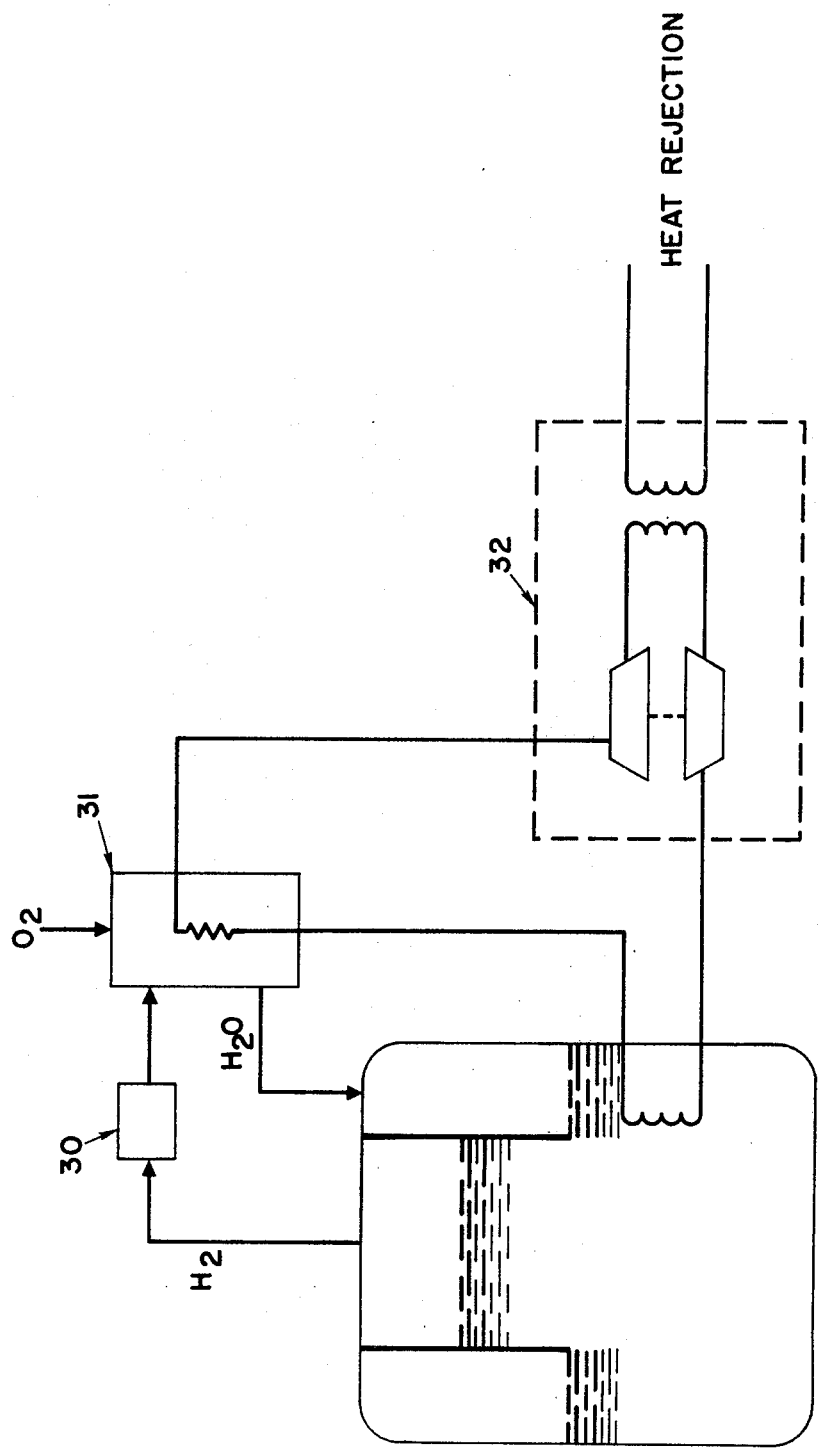
FIG. 4 is a schematic representation of an energy conversion system using the hydrogen generator in which both the hydrogen and the thermal energy are applied to a thermal engine.

Although not capable of achieving the high system efficiency attainable in the preceding embodiment, the system depicted in FIG. 4 enjoys several other advantages. It is simpler and cheaper, since the relatively expensive fuel cell has been eliminated. Also, the generator operates at a much lower temperature, and the separate combustion chamber where high temperatures are achieved is very small relative to the generator size. Thus, the system has less heat loss and less stringent metallurgical conditions.

In FIG. 4, a schematic representation of this alternative, the working fluid for a thermal engine 32 is heated in two stages. It is initially heated to an intermediate temperature such as in the range 400° to 800°F in the hydrogen generator. Then it is further heated to a maximum temperature such as 1600°F in a combustion chamber 31. The source of heat to the combustion chamber is the combustion of hydrogen and oxygen; the hydrogen is from the hydrogen generator, and is forcibly injected into the combustion chamber by injection means 30, whereas, the oxygen is controllably injected through controllable injection means 33. The product $H_2O$ returns to the hydrogen generator through a conduit to generate additional heat and hydrogen. The respective temperature in the combustion chamber and hydrogen generator is controlled by adjusting the relative injection rates of hydrogen and oxygen.

If air is used as the oxidant instead of pure oxygen, a means to separate the $H_2O$ from the other constituents of the air before recycling the $H_2O$ to the hydrogen generator must be incorporated. This could be done by a condenser for one example.

ALTERNATIVE 2 — ENERGY CONVERSION SYSTEM

Figure 5:
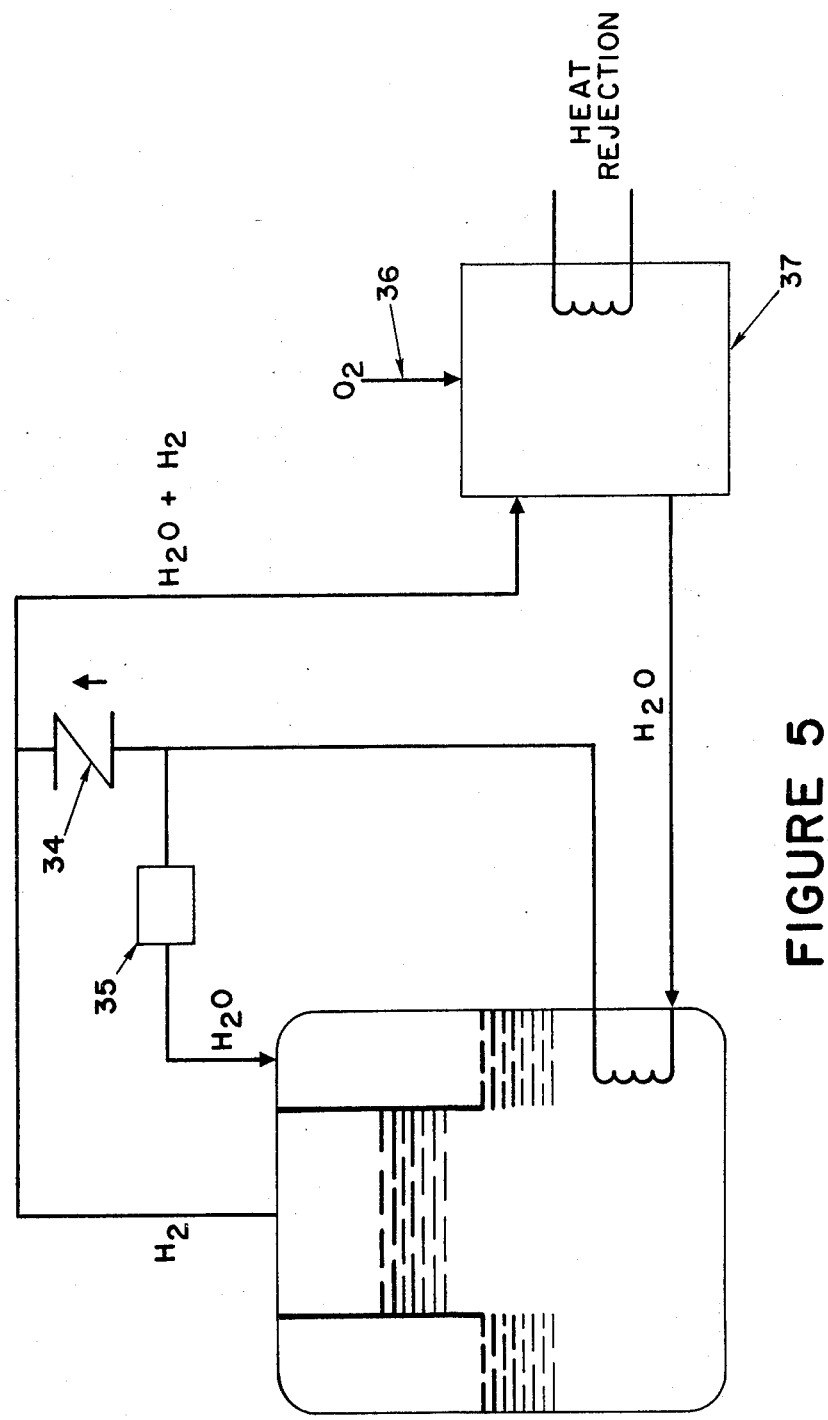
FIG. 5 is a schematic representation of an energy conversion system using the gas generator in which both the generated gas and the thermal energy are applied to a thermal engine, and in which the generated gas is combined intimately with and forms part of the working fluid of the thermal engine.

This system, depicted schematically in FIG. 5, is similar to the preceding alternative in that only a thermal engine is employed for the production of useful energy (i.e., mechanical or electrical energy); a fuel cell is not used. The difference in this system is that there is only a single working fluid throughout the whole system, i.e., the same hydrogen and $H_2O$ which undergoes reaction in the hydrogen generator is also the working fluid for the thermal engine.

In FIG. 5, a mixture of hot $H_2$ and $H_2O$ is the working fluid which is inputted to a thermal engine 37. This fluid undergoes additional combustion and heat release within the thermal engine by being burned with oxygen which is inputted to the thermal engine through injection means 36. The spent working fluid (substantially pure $H_2O$) effluent from the thermal engine is partially heated in the heat exchange means of the gas generator. Then part of it is injected into the inlet gas space of the hydrogen generator by controllable injection means 35, while the remainder passes through a means for preventing backflow 34, such as a check valve, and then joins with hydrogen effluent from the generator. The mixture is conducted to the thermal engine through a conduit, completing the cycle.

The thermal engine in this application can be a modified diesel engine, where the oxygen is injected into cylinders holding the compressed mixture of $H_2$ and $H_2O$ (instead of diesel fuel being injected into compressed air); alternatively, a multi-staged turbine can be used where reheating is accomplished between the stages by injecting oxygen into the working fluid and combusting it.

Just as the preceding alternative, this alternative energy conversion system can operate on air vice oxygen, requiring incorporation of a condenser to separate the $H_2O$ from the non-condensable constituents of air.

Additional energy conversion systems based on the disclosed hydrogen generator will be obvious to one skilled in the art in light of these teachings. Two additional examples will be mentioned briefly without illustration. First, the thermal energy from the hydrogen generator can be applied to produce additional hydrogen from $H_2O$ using a known process. In that manner, a very high total yield of hydrogen will be realized from operation of the gas generator, which can be further utilized variously. Secondly, the thermal energy can be applied to a conventional Rankine cycle electrical generator, and the hydrogen to a gas distribution system, whereby the hydrogen generator becomes the basis for an integrated self-contained community power supply.

It will be recognized that whereas incorporated of the baffle feature into the gas generator adds very desirable features, it is not essential to the functioning of the gas generator, that is, the gaseous reactant can be injected directly into the liquid reactant.

I claim:

1. An energy conversion system comprised of:
   hydrogen gas generator of the type in which a gas is produced by an exothermic chemical reaction between a gaseous substance and a liquid substance which is present in excess, and in which heat exchange means is incorporated;
   a conduit to remove the gas produced in the gas generator;
   a fuel cell which receives the gas produced by the gas generator through the conduit and uses that gas as one of its reactants;
   a thermal engine which is powered by the heat from the exothermic reaction in the gas generator, the heat being transferred to the thermal engine by the heat exchange means.

2. A system as recited in claim 1 wherein the operating temperature of the gas generator is a temperature selected from the range 400° to 2400°F.

3. A system as recited in claim 2 wherein the gas produced is comprised of hydrogen.

4. A system as recited in claim 3 wherein the reacting gaseous substance is comprised of $H_2O$ and the reacting liquid substance is comprised of constituents selected from the list Al, Na, Li, LiH, K, Ca, Mg, and Si.

5. A system as recited in claim 4 wherein the fuel cell is a hydrogen oxygen fuel cell, and further comprised of a $H_2O$ conduit which is used to recycle the product $H_2O$ from the fuel cell to the gas generator where it comprises the reacting gaseous substance.

6. A system as recited in claim 5 further comprised of a hydrogen surge tank connected to and communicating with the hydrogen conduit.

7. A method of producing useful energy comprising the steps of:
- a generating hydrogen from an exothermic reaction between a gaseous substance and a liquid substance which react to produce hydrogen said liquid substance being present in excess;
- converting the thermal energy from the exothermic reaction to useful energy in a thermal engine;
- converting the hydrogen to useful energy by reacting it with an oxidant in an energy conversion device.

8. A method as recited in claim 7 wherein the energy conversion device employs an electrochemical reaction.

9. A method as recited in claim 7 wherein the energy conversion device is a second thermal engine.

10. A method as recited in claim 7 wherein the energy conversion device is the thermal engine.

11. A method as recited in claim 7 wherein the generated gas comprises part of the working fluid of the thermal engine.

* * * * *